July 30, 1968  YASUYUKI KOSHI  3,394,748
DEFORMABLE VEHICLE WHEEL
Filed May 18, 1966
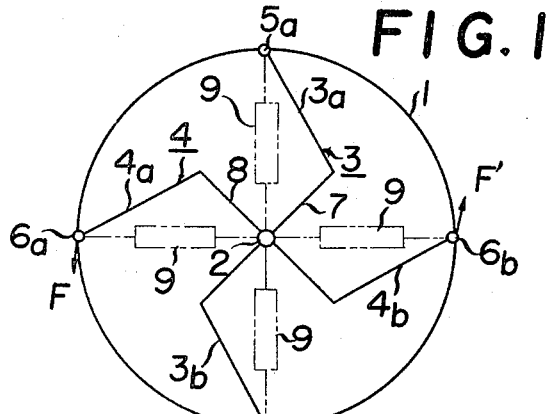
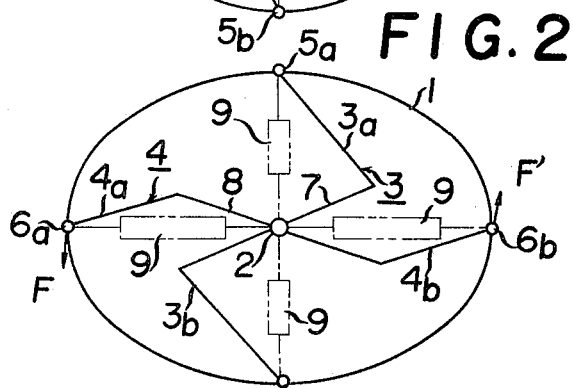
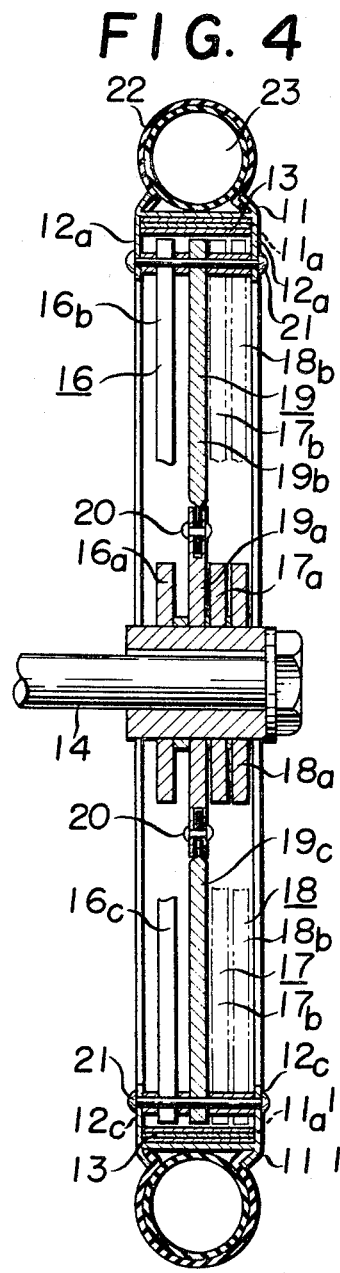
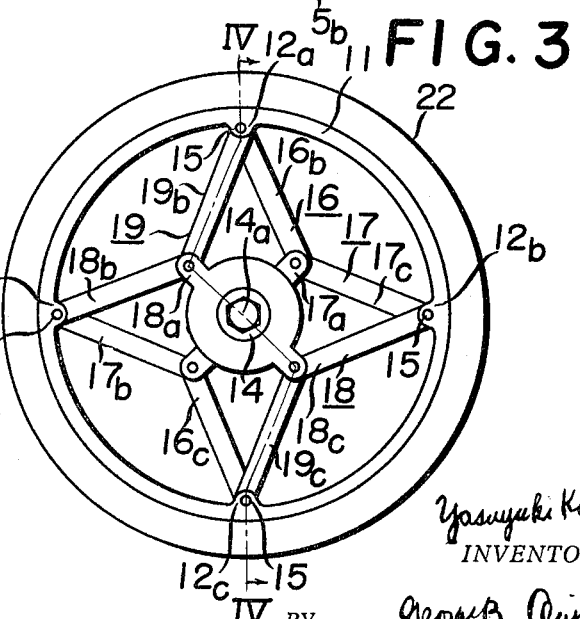
Yasuyuki Koshi
INVENTOR.
George B. Oujevolk
BY
Attorney 3,394,748
DEFORMABLE VEHICLE WHEEL
Yasuyuki Koshi, 13 1-chome, Asahi-cho,
Fuchu-shi, Tokyo, Japan
Filed May 18, 1966, Ser. No. 551,072
Claims priority, application Japan, May 24, 1965,
30,715/65
6 Claims. (Cl. 152—6)

ABSTRACT OF THE DISCLOSURE

A wheel structure for vehicles having a resilient rim. Link means connect the rim to the hub of the wheel to act such, that when the wheel axle is loaded, at low speeds or when the vehicle is stationary, the rim of the wheel is elastically deformed into an ellipse thereby providing a large traction or braking area.

---

This invention relates to wheel structures for use mainly in vehicles for conveying heavy goods such as motortrucks, wagons, rear-cars and the like.

Prior wheels of such vehicles for conveying heavy goods comprise wheels which are fixed to axles supported by the vehicle frames through spring saddles which provide required shock cushioning action between frames and axles. Generally, these wheels are of rigid construction so that they cannot provide any cushioning action by themselves and only a slight cushioning action against adverse road conditions has been afforded by tires mounted on the wheels.

Since the maximum tractive force of a wheel mounted upon a driving axle is determined by such factors as the coefficient of friction between the tire on the wheel and the road surface, the load on the wheel, the inclination angle of the road surface and the like, there is a tendency to slip on slippery road surfaces such as those covered by rain water or snow. In snowy seasons it is usual to mount anti-slipping chains on wheel, but such a means is not effective for roads made wet by water. Further caterpillar type driving means which are used for vehicles running on snow are not advantageous because of their low speed.

This invention contemplates the elimination of the difficulties mentioned above by providing a wheel structure wherein the rim itself has sufficient cushioning ability, and the contact area between the wheel and the road surface is large at the time of starting, stopping, as well as during low speed running so as to provide a large tractive force or braking force but as the speed of the vehicle increases the configuration of the wheel rim will approach a more perfect circle thus assuming a shape suitable for high speed runnnig.

The wheel structure constructed according to this invention comprises a resilient rim having a supporting axle at its center, and a plurality of three-link-rods with their outer ends pivotally connected to said resilient rim at points located symmetrical to said supporting axle and with the intermediate points of the center rods of the pairs connected to said supporting axle.

In a modified form of this invention one set of said three-link-rods is fixed to a supporting axle which is driven at the intermediate point of the center rod.

The resilient rim of the novel wheel may be formed of a plurality of superposed resilient steel strips. Alternatively, the resilient rim may comprise a construction wherein a resilient member consisting of a plurality of superposed steel strips is fitted in an annular groove provided in a resilient annulus. Further, said three-link-rods may comprise a spring mechanism prestressed in its extensible direction.

The principles and features of the invention will be more readily understood from the following detailed description, taken in conjunction with the accompanying drawing, in which:

FIG. 1 is a diagrammatic front elevational view of the wheel structure embodying the principle of this invention;

FIG. 2 is a similar view of the wheel structure under a load;

FIG. 3 is a front elevational view showing one practical construction of this invention; and FIG. 4 is a sectional view taken along a line IV—IV in FIG. 3.

Referring now to FIG. 1 of the accompanying drawing, the vehicle wheel of this invention comprises a resilient rim made of a resilient steel annulus, for example, and a driving axle having its axis 2 at the center of the annulus. The wheel further comprises two pairs of three-link rods 3 and 4 are further provided with center rods 3a, 3b, and 4a, 4b, respectively, of the same length. The outer ends of these rods are pivotally connected to the rim 1 at points symmetrical with respect to the center axis 2, thus dividing the periphery of the rim into four equal sectors at the pivotal points 5a, 5b, 6a and 6b. Said three-link-rods 3 and 4 are further provided with center rods 7 and 8 having approximately twice the length of said rods 3a, 3b, 4a and 4b. The intermediate point of said center rod 7 is rotatably mounted upon said driving shaft around the axis 2, whereas the intermediate point of the other center rod 8 is fixedly mounted on the driving shaft, by means of a key, for example. It is preferable to provide piston-cylinder mechanism and the like, shown by dotted lines 9 in FIGS. 1 and 2, between each of the pivotal points 5a, 5b and the axis 2 to provide expanding pressures which may be constant or adjustable.

As shown in FIG. 2 when a load W is applied to the driving shaft the resilient rim 1 will be deformed into elliptical shape by being compressed in a direction along a line passing through the pivotal points 5a and 5b. Under this condition, the center rod 8 will be driven by the driving shaft to transmit driving torques F and F′ in the direction of tangent to the pivotal points 6a and 6b.

In designing the wheel it is necessary to give a strength for the resilient rim 1 such that loops between pivotal points 5a, 6a; 6a, 5b; 5b, 6b; and 6b, 5a have sufficient strength against the load so that even when the intermediate points on said loops between these pivotal points come to contact with the ground, these loops can maintain their curved shape, and will not be crushed whereby the height of the wheel axle above the road surface is maintained at a constant value. Each of the piston cylinder mechanism diagrammatically shown in FIGS. 1 and 2 by dot and dash lines comprises a cylinder, a spring and a piston contained in the cylinder and is normally biased outwardly to supplement the restoring force which is effective to preserve the resilient rim 1 in perfect circular configuration. Alternatively a variable oil pressure may be introduced into the piston cylinder mechanisms 9 so that the pressure is minimum when lines respectively connecting points 5a and 5b and 6a and 6b are in the horizontal direction, whereas the pressure is maximum when said connecting lines are in the vertical direction. This pressure is of the magnitude only sufficient to decrease the tendency of the resilient rim 1 to deform into an elliptical shape and not maintain the rim in the perfect circular shape.

While the wheel structure shown in FIGS. 1 and 2 is constructed to be mounted upon a driving shaft, it may be mounted on a driven shaft. In the latter case the three-link-rod 4 may be constructed such that it can be rotatably mounted on the driven shaft.

In this case, it is necessary to make the rolling friction of the wheel which has been deformed into elliptical shape less than the slippage friction of the wheel on the road surface so that the driven wheel can rotate to follow the forward as well as rearward movements of the vehicle.

With the wheel structure constructed as above described, as the running speed of the vehicle increases, the resilient rim 1 will gradually restore its perfect circular configuration, thus changing into a wheel construction suitable for high speed vehicles for carrying heavy load.

A more practical construction will now be described by referring to the embodiment shown in FIGS. 3 and 4. The resilient rim generally designated by a reference numeral 11 has a substantially U-shaped annular groove at its outer circumference and a resilient annulus defining an annular groove 11a has, on the both sides thereof, ears 12a, 12a; 12b, 12b; 12c, 12c; and 12d, 12d respectively thereof, which are equally spaced along the inner periphery of the annulus, said annular groove 11a being adapted to receive a plurality of layers of resilient steel strips 13. Said pairs of ears 12a, 12c and 12b and 12d are respectively provided with openings 15 for pivotal connections at points which are symmetrical with the central axis 14a of a driving shaft 14.

Three-link-rods designated by 16, 17, 18 and 19 are provided with intermediate center rods 16a, 17a, 18a and 19a aligned with the central axis 14a of the driving shaft 14. Center rods 16a, 17a and 18b are rotatably mounted on the driving shaft 14 whereas the remaining center rod 19a is fixedly mounted upon the driving shaft 14. With the opposite ends of the central rods of respective three-link-rods 16, 17, 18 and 19 are respectively connected rods 16b, 16c; 17b, 17c; 18b, 18c and 19b, 19c by means of pins 20, the outer ends of said rods 16b, 16c . . . 19b, 19c being pivotally connected to said ears 12a . . ., by pins 21 passing through openings 15. A tire 22 containing an air fitted tube 23 is mounted on the outer periphery of the resilient rim 11, it being to be understood that said tire 22 and tube 23 are constructed to have sufficient resiliency so that they can also deform into elliptical configuration as the resilient rim 11 is deformed elastically.

The wheel structure shown in FIGS. 3 and 4 is driven in the same manner as that shown in FIGS. 1 and 2. Thus the torque of the driving shaft 14 is transmitted to the resilient rim 11 via three-link-rod 19 to cause it to roll on the road surface.

While in the above embodiment the three-link-rods are connected to the resilient rim at four points, the number of such connecting points may be increased to any even numbers which are multiples of four in order to assure smooth rotation of the wheel by decreasing unsmooth rotation thereof due to the resilient strength of the resilient rim.

The foregoing embodiments of the invention clearly illustrate the principles thereof. Various other embodiments of these principles may occur to workers in the art without departing from the spirit and scope of the invention as defined in the appended claims.

What is claimed is:

1. A wheel structure for vehicles comprising a resilient rim, a supporting axle, and a plurality of three-link-rods, each comprising a center rod rotatably mounted on said axle at an intermediate point thereof and two-link-rods, an outer end of each of the link rods being pivotally connected to said resilient rim at points symmetrical with respect to said axle, the other end thereof being pivotally connected to the end of the center rod.

2. The wheel structure according to claim 1 comprising means to fix the center rod of one of the three-link-rods at its intermediate point to the axle thus causing said wheel structure to act as a driving wheel.

3. The wheel structure according to claim 1 wherein said resilient rim is formed by a plurality of laminated resilient steel strips.

4. The wheel structure according to claim 1 or 3 wherein said resilient rim comprises an annulus of a substantially U-shaped cross-section and a resilient member consisting of a plurality of laminated steel strips and contained in said U-shaped annulus.

5. The wheel structure according to claim 1 wherein a tire is mounted around the periphery of said resilient rim.

6. The wheel structure according to claim 1 wherein said three-link-rods comprise mechanisms adapted to apply prestresses in the direction of centrifugal force.

References Cited

UNITED STATES PATENTS

| | | | |
|---|---|---|---|
| 1,037,446 | 9/1912 | Coulter | 152—6 |
| 1,332,486 | 3/1920 | Cherpech | 152—6 |

EUGENE G. BOTZ, *Primary Examiner.*